United States Patent [19]
Hodges

[11] 3,852,687
[45] Dec. 3, 1974

[54] HIGH RATE DIGITAL MODULATION/ DEMODULATION METHOD AND MEANS

[75] Inventor: Paul Hodges, San Jose, Calif.

[73] Assignee: International Business Machines Corporation, Armonk, N.Y.

[22] Filed: July 2, 1973

[21] Appl. No.: 375,405

[52] U.S. Cl. ........... 332/11 R, 178/66 R, 325/38 R, 340/146.1 D, 340/347 SY

[51] Int. Cl. ........................................... H03k 13/17

[58] Field of Search .................. 332/9 R, 9 T, 11 R; 325/38 R; 340/146.1 R, 347 R, 347 SY, 146.1 D; 178/66 R

[56] References Cited

UNITED STATES PATENTS 3,587,090 6/1971 Labeyrie et al................ 340/347 R

*Primary Examiner*—Alfred L. Brody
*Attorney, Agent, or Firm*—Nathan N. Kallman

[57] ABSTRACT

An electrical digital transmission method and circuits for improving recorded or transmitted information density. The embodiment serially modulates signal switching with a separation of at least two adjacent clock periods and not over eight clock periods in any sequence of byte transmissions. A fixed length transmission per byte is used. A serial clock cycle is provided per data byte and may be divided into two clock cycle sections. The first clock period of each section is not available for information modulation switching. The remaining clock periods of each section are available to contain electrical current switchings to encode a part of an information byte by permuting the switchings while maintaining the required switching separation. The first clock period of each section contains a switching only if no information induced switching occurs in its adjacent clock periods. These clock switchings assure an output switching within a maximum number of clock periods equal to the longest of the two sections.

6 Claims, 11 Drawing Figures

SWITCHING PATTERNS FOR T1

SWITCHING PATTERNS FOR T9

EXAMPLES OF SWITCHING PATTERNS FOR BYTES

HIGH RATE DIGITAL MODULATION/METHOD AND MEANS

BACKGROUND OF THE INVENTION

The subject invention relates to digital modulation/-demodulation methods and circuits intended to improve the rate at which digital information can be transmitted or stored on a magnetic surface.

Various ways have been proposed for increasing the density with which data can be recorded on disks or similar magnetic media in data utilization system having a rate which can be reliably transmitted through existing channels. One such technique is run-length-limited coding, which requires, during recording or transmission, that each signal switching in a coded sequence be separated by a minimum number of clock cycles in order to minimize inter-switching interference and not to exceed a maximum number of no-switching clock periods required for self-clocking purposes during signal detection. The present invention is directed particularly to the use of a particular improvement in run-length-limited coding having a fixed length per information byte in digital magnetic recording and transmission line digital transmission systems.

Run-length-limited coding is disclosed in U.S. Pat. No. 3,689,899 to P. A. Franaszek. Other pertinent coding art is found in U.S. Pat. Nos. 3,624,637 to J. W. Irwin; 3,639,900 H. C. Hinz, Jr.; 3,587,090 to Labeyrie; 3,281,806 to Lawrance, etal; 2,864,078 to Seader; 3,226,685 to Potter and 3,374,475 to Gabor.

The highest density self-clocking recording techniques in current commercial use are the phase encoded (PE) and modified frequency modulation (MFM) methods, each of which generally uses 16 clock periods per clock cycle to record a byte of 8 data bits. MFM is the more efficient and it obtains a minimum run-length-limited peroid of no-switching for two clock peroids in a clock cycle requiring 16 clock periods. In such context, the subject invention can also have a minimum run-length-limited period of two clock periods, but it can encode the ssame 8 bit byte in a clock cycle having 13 clock periods instead of 16 clock periods as found in PE or MFM. The result of this invention is a 23 percent increase over MFM in byte data density in a track on a magnetic surface using the same magnetic switching density in each case. When the invention is applied to a telephone line transmission system, the byte transfer rate can obtain the 23 percent increase without any change in the bandwidth of the line or in the switching rate of the digital electrical signals on the transmission line.

SUMMARY OF THE INVENTION

The subject invention relates to digital modulation and demodulation methods and circuits which are capable of communicating more information on less bandwidth in a single channel than currently used commercial techniques. The invention is particularly useful in improving the information density in a track on a magnetic recording surface without a corresponding increase in the flux switching density or flux switching resolution. The subject invention permits a 146 percent increase in information content over PE modulated recording in a track on the magnetic surface without increasing the flux switching density actually recorded, and the invention provides a 23 percent information increase over MFM modulated recording in a track on a magnetic surface, such as a tape or disk track. That is, such increase in data density can be obtained with this invention in a magnetic disk drive with no change in heads, disks, access mechanism, or clock rate. Furthermore the invention obtains its increase in recorded density even though it requires a number of clocking periods (e.g. 13) in a clock cycle which is greater than the number of information bits transmitted and recorded during the clock cycle. Hence, a non-integral ratio of clock periods to information bits is generally obtained by the invention.

The modulation/demodulation methods and circuits of this invention are also useful in increasing the amount of digital information transmittable over a communication line (e.g. telephone line) without requiring any increase in the bandwidth of the line.

It is therefore an object of the subject invention to improve the information density of serial digital transmissions over telephone lines or on a magnetic surface.

It is another object of this invention to provide a special type of run-length-limited modulation technique which provides an unique waveform for each different byte coding, in which the waveform has both maximum and minimum run-length-limited clock time intervals during which no voltage switching can occur, e.g. a minimum of two and a maximum of eight run-length clock periods of no switching within a 13 clock period cycle per information byte.

It is a further object of this invention to provide a digital modulation/demodulation technique providing an unique waveform for every different byte combination, in which the clock intervals are divided into two sections (e.g. clock periods 1 to 8 and 9 to 13 that may correspond to two parts of each byte, such as its bit position 0 to 4 and 5 to 7, respectively).

It is a still further object of this invention to provide a digital modulation/demodulation technique having a waveform divided into two clocking sections, in which a clock period in each section is not directly related to the encoding to the data in any byte, (e.g. at clock periods 1 and 9 which begin the clocking sections 1–8 and 9–13). Switching at each of the non-information clock times (such as 1 and 9) is determined by the lack of switching in its adjacent clock periods in order to obtain at least a two clock period minimum run-length-limit of no switching.

The foregoing and other objects, features and advantages of the invention will be apparent from the following more particular description of the preferred embodiments of the invention, as illustrated in the accompanying drawings.

DETAILED DESCRIPTION OF PREFERRED MODULATION EMBODIMENT

Figure 1:
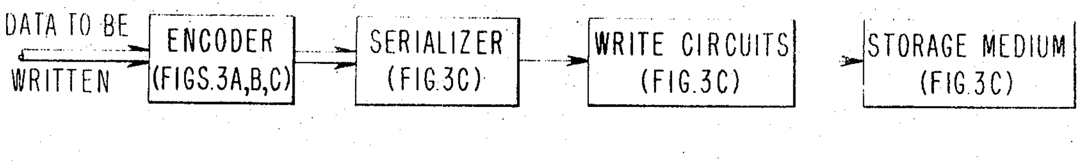
FIG. 1 represents an encoding circuit arrangement which may contain the subject invention for recording digital signals on a magnetic storage medium.

FIG. 1 illustrates a general encoding scheme for serially writing signals on a magnetic storage medium. The data to be written is received in groups of bits, such as the conventional byte format of eight information bits from a data processing system, e.g. central processing unit, channel, or control unit. An encoder and serializer generate a modulated electrical waveform from each received groups of bits. The modulated waveform is transmitted to write circuits, and then to a write head, which transmits the waveform for recording onto a storage medium, e.g. magnetic disk surface.

Figure 3A:
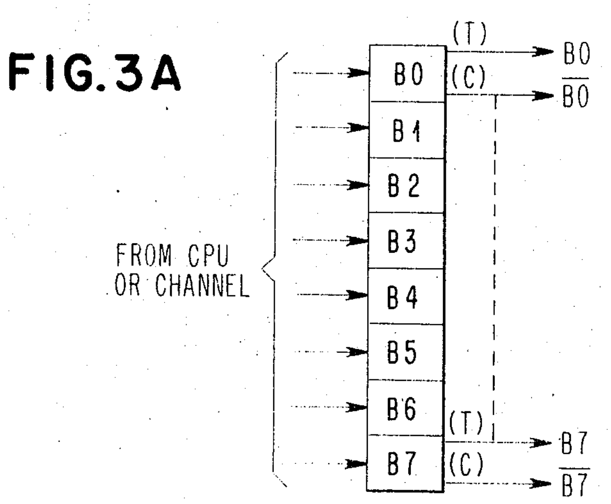
FIGS. 3A, 3B and 3C illustrate an encoding embodiment of the invention.
Figure 3B:
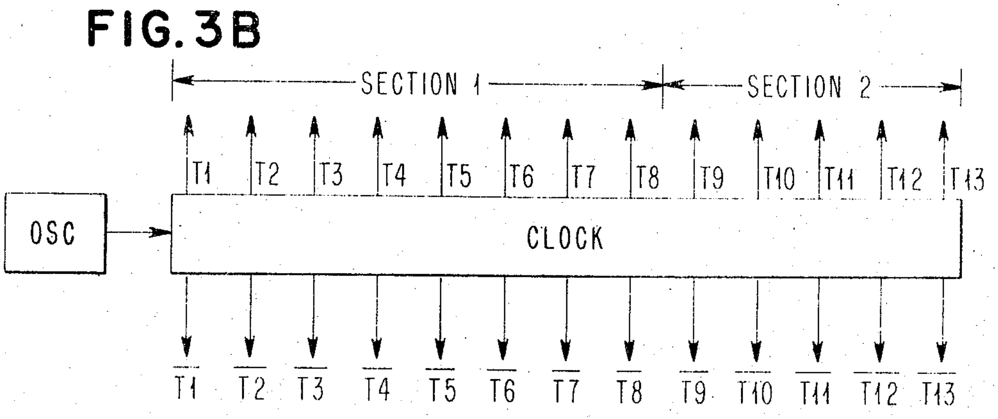
Figure 3C:
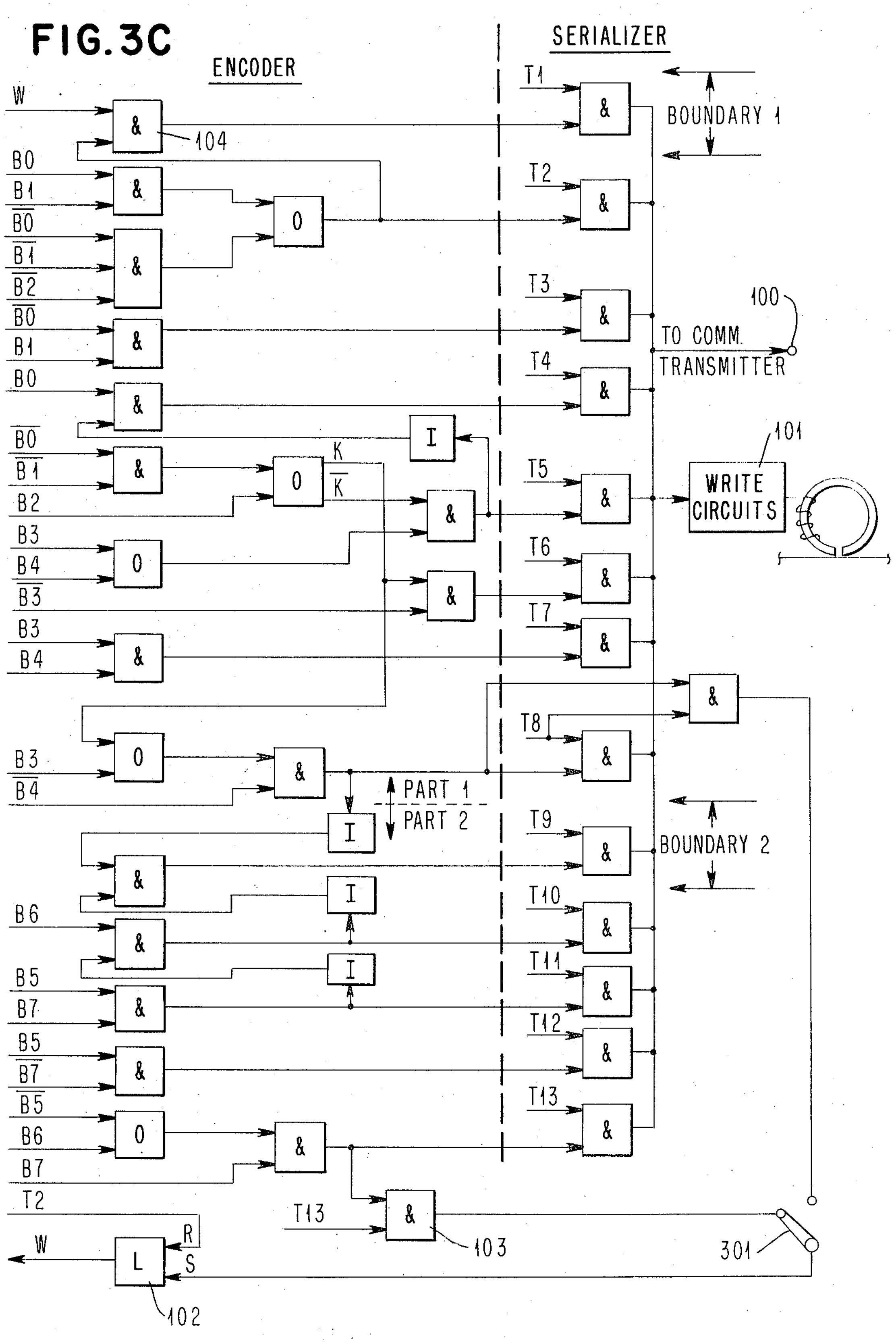

Detailed circuits for electrically performing the encoding operation are shown in FIGS. 3A, 3B and 3C. The waveform generated by this invention embodiment with a switch 301 (FIG. 3C) in its illustrated position is formed by permuted electrical switchings in a 13 clock period cycle, having run-length-limits from two to eight clock periods.

FIG. 3A illustrates a byte input register containing eight information bit positions B0 through B7 which receives a group of information bits which may be provided as byte having eight parallel bits. Each position in the input register has both true (T) and complimentary (C) output lines, e.g. B0 and $\overline{B0}$, etc. The output of the register in FIG. 3A is provided as an input to the encoder circuits shown in FIGS. 3C.

FIG. 3B illustrates a conventional type of clock circuit, driven by a free-running oscillator. The clock has 13 pairs of output lines T1, $\overline{T1}$ through T13, $\overline{T13}$ which define 13 separate clock periods that time the operation of the encoder circuit. Each clock position provides true and complementary outputs, e.g. T1 for true output and $\overline{T1}$ for its complementary output. The clock only has one of the output of I1 – T13 in an up voltage state at any one time, and all of its other outputs are then in their down voltage state. Thus a pulse is provided first from lead T1, then from lead T2, etc. through output T13 and back to output T1, etc. in a continuously cyclic manner comprising a cycle of 13 sequential clock pulses defining the 13 clock periods. The clock circuit may be a shift register with end-around feedback having 13 latch positions with only one of the positions in a set state which is continuously being circulated as the shift register is driven by the oscillator. Thus each of 13 latches in the shift register is continuously providing both true and complementary outputs as inputs to the serializer in FIG. 3C.

The circuit arrangement for the encoder in FIG. 3C receives each byte on the eight parallel information bit lines B0 through B7 provided from the byte input register in FIG. 3A. The encoder in FIG. 3C encodes the eight information bits in each received byte into 13 separate electrical states provided on the encoder's 13 output lines to the serializer also shown in FIG. 3C.

The serializer comprises 13 AND gates which respectively receive the 13 output lines from the encoder, and also respectively receive as inputs the clock period lines T1 – T13 from FIG. 3B. The outputs of all of the AND gates comprising the serializer are combined together as a single serial output connected either to a communication transmitter via terminal 100, or to write circuit 101 which shape, amplify and provide the signal current to a recording head that writes the signals as flux switching between two magnetic states on a moving magnetic surface, e.g. magnetic disk.

The encoder in FIG. 3C also generates a clock continuity signal W to signal to the next group of bits whether or not a flux switching occurred during the last clock pulse T13 in the recorded waveform for the immediately prior group of bits. This is done in FIG. 3C by a latch 102 which is set by an output from serializer AND circuit 103 to provide the output signal W. Latch 102 is reset by clock pulse T2, since the W output of the latch is only used during clock pulse T1 by AND circuit 104 of the encoder. (However latch 102 could be reset by any of the clock pulses up to the penultimate pulse T12.) The connections among the AND circuits & and OR circuits O in FIG. 3C is completely illustrated.

Figure 5A:
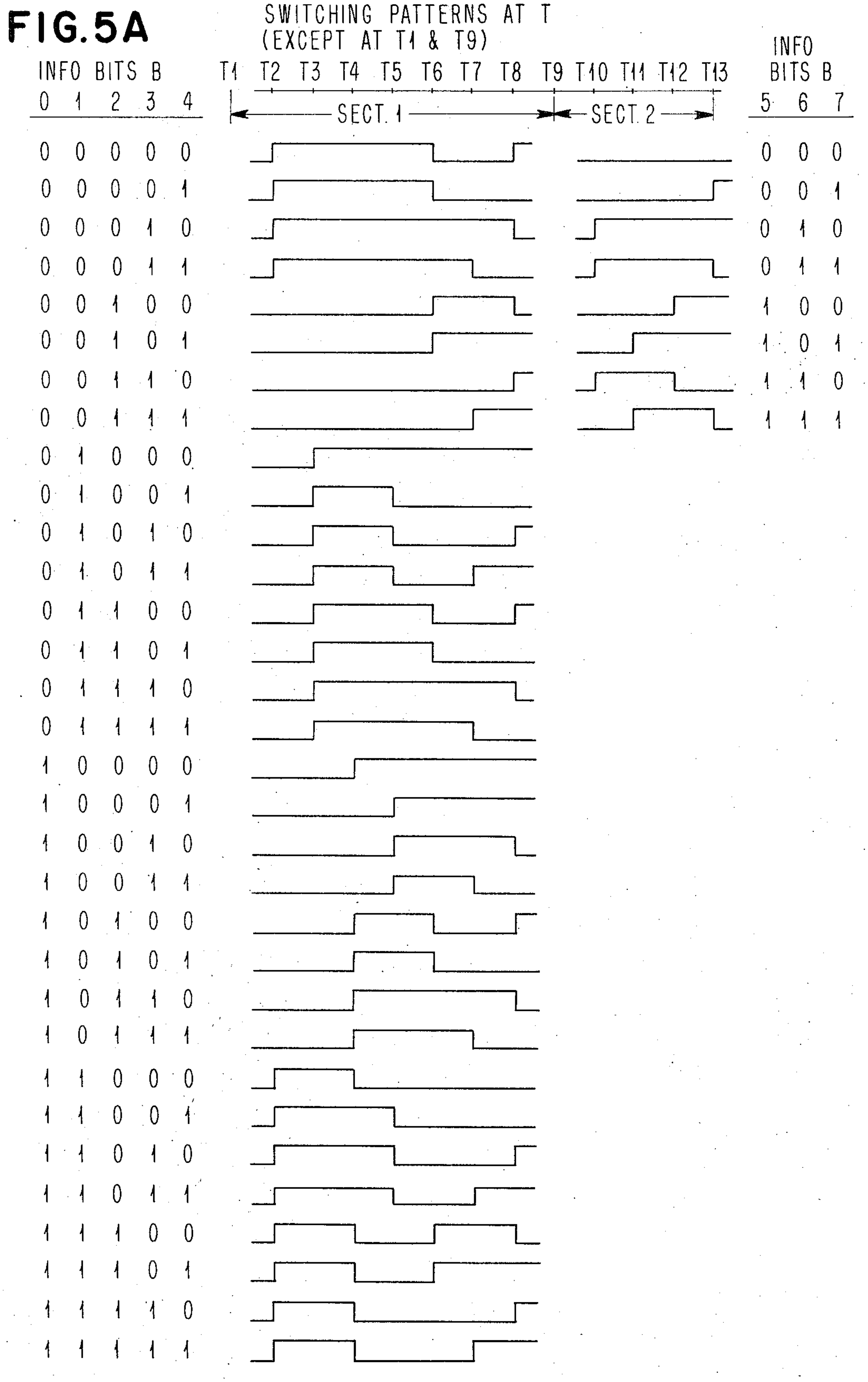
FIGS. 5A, 5B and 5C show permuted switching patterns which are used by the preferred embodiments of the invention to record information on a magnetic storage medium.
Figure 5B:
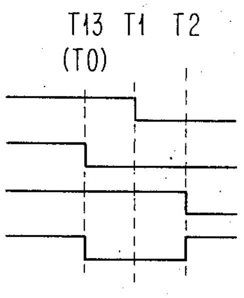
Figure 5C:
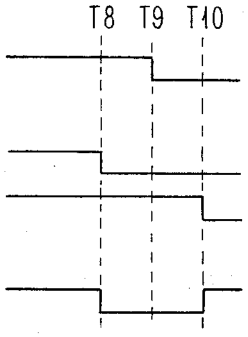

FIG. 5A, 5B and 5C show the electrical waveforms generated by the encoder and serializer in FIG. 3C. Specific modulation patterns for five bit groups (B0 – B4) are illustrated in eight clock pulse periods (I1 – T8) on the left side of FIG. 5A; and specific modulation patterns for three bit groups are illustrated in five clock pulse periods (T9 – T13) on the right side of FIG. 5A. Any specific eight bit group is formed by concatenating a five bit group and a three bit group, and the specific modulation pattern is obtained by concatenating their corresponding modulation patterns (i.e. eight period pattern and five period pattern.) Specific byte modulation waveform examples having eight bit groups are shown in FIG. 6.

Figure 6:
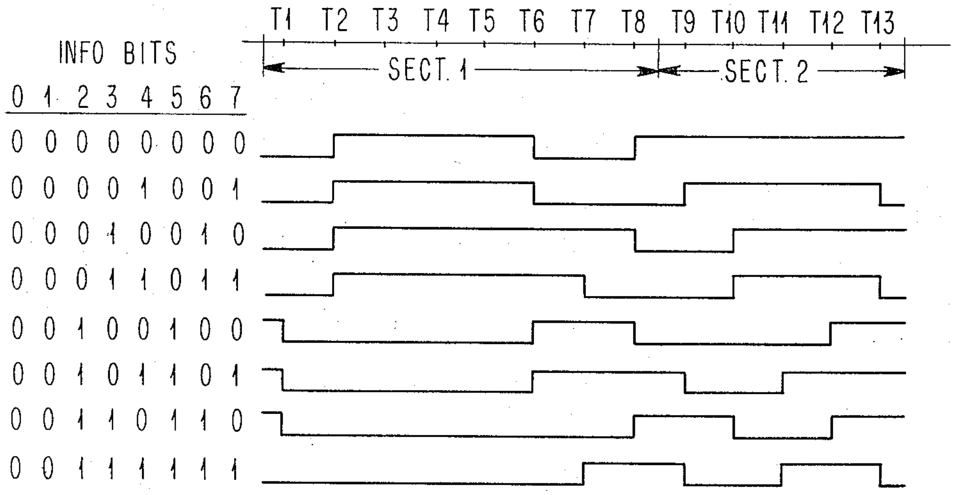
FIG. 6 illustrates examples of electrical switching patterns which may be generated by the invention.

The digital modulation patterns in FIGS. 5A and 6 comprise electrical switchings between two DC current levels which can be transmitted and recorded as flux switchings between two magnetization levels on a magnetic surface.

The modulation is done in two sections for each eight bit group. The first section permutes the switchings during clock periods T2 through T8 in response to the binary combination of the first group of information bits 0 through 4 in any byte. The allowable patterns in section 1 have at least one switching in T2 through T8. Section 2 permutes the switchings during clock periods T10 through T13 in reponse to the binary combination of the second group of information bits 5, 6, and 7 in the byte. The allowable patterns in FIG. 5A in sections 1 and 2 can have no information modulation switching in their boundary clock periods T1 and T9. No pattern has switchings in any two adjacent periods.

The switching pattern at clock period T1 or T9 is a special case which does not depend directly upon the information bits but depends upon the proximity of modulation switchings i.e. switchings in clock periods adjacent to clock periods T1 and T9. The allowable switching patterns for clock period T1 are shown in FIG. 5B, which shows a switching at time T1 only if there is no switching at either time T2 or at time T0 (i.e. the prior T13). Similarly for clock period T9, as shown in FIG. 5C, a switching is allowable at T9 only if there is no switching at either of adjacent clock periods T8 or T10.

The modulation waveform for the section 1 clock periods T1 through T8 is therefore catenated with the modulation waveform for the section two clock periods T9 through T13 to obtain the 256 separately discernable waveforms representing an 8-bit byte of which examples are shown in FIG. 6. Thus complete byte modulation switching patterns are shown in FIG. 6 as examples of the types of modulations that can occur. However for T1, the controlling clock period T0 (i.e. prior T13) is not illustrated in FIG. 6, i.e. whether or not a switching occurred in the immediately preceding T13, which is arbitrarily assumed not to have switched for the 5th, 6th, and 7th waveforms from the top of FIG. 6, but such T1 switching could not have occurred in these same waveforms if the prior cycle T0 had switched. In the bottom waveform in FIG. 6, T1 does not have a switching on the assumption that the prior clock period T0 had a switching; but if such prior period T0 did not have switching, the switching would then occur at T1.

In clock period T9 in FIG. 6, the switching occurs only if there is no switching occurring in clock period T8 or T10, which is apparent from an inspection of these examples.

DETAILED DESCRIPTION OF PREFERRED DEMODULATION EMBODIMENT

Figure 2:
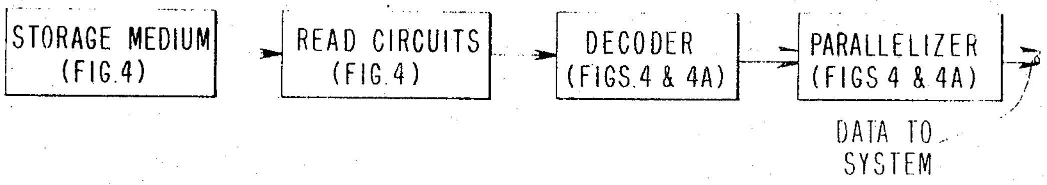
FIG. 2 shows a decoding circuit arrangement which may contain the subject invention for detecting information previously recorded on a magnetic storage media.

FIG. 2 illustrates a general detecting arrangement which can embody this invention. Digital signals are read by a magnetic head from a magnetic storage medium, e.g. magnetic disk surface. A read head senses the flux switchings on the magnetic surface as an electrical wave having pulses related to the timing of the flux switchings sensed from the magnetic surface. The sensed pulses are provided to a read circuit which may be a pulse peak detector of the type commercially used for detecting the time positions of flux reversal recordings on magnetic surfaces to generate narrow pulses which precisely relate their phasing to the flux switching positions on the magnetic surface. The read circuit pulses are provided to a decoder which decodes the pulses into information bits which are provided to a parallelizer which accummulates the bits of each byte for parallel transmission to a control unit, channel, or central processing unit.

Figure 4:
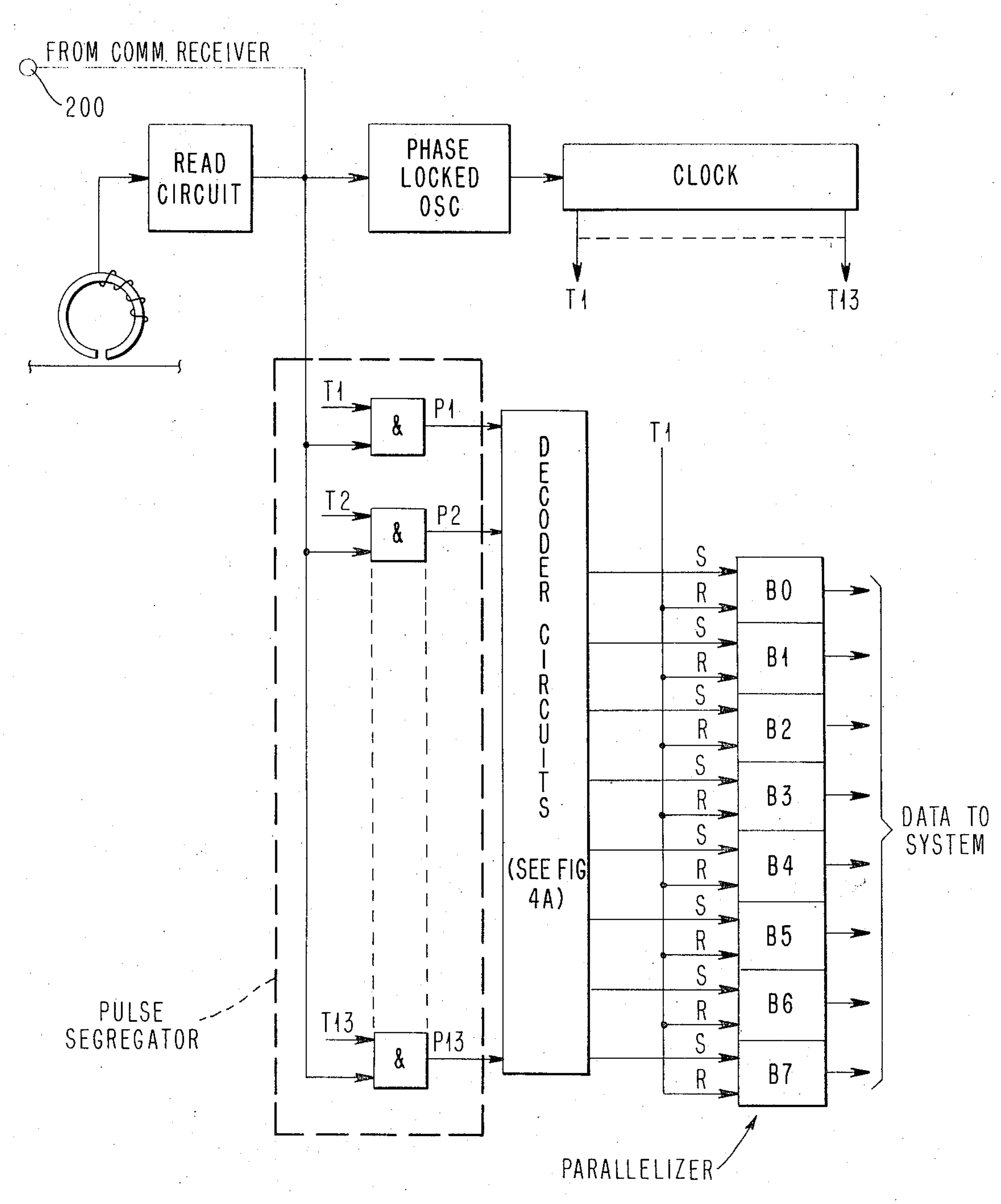
FIGS. 4 and 4A show a decoding embodiment of the invention.

FIG. 4 shows a detailed drawing of a demodulator embodiment of this invention within the decoding scheme shown in FIG. 2 in which a magnetic head senses the flux recorded on the moving magnetic disk surface to generate therefrom an electrical signal which is transmitted to a read circuit which precisely detects the flux switchings.

The pulses at the output of the read circuit represent the modulated waves provided by the modulator which generated the signals, but in a different form than shown in FIG. 6. That is, a pulse is provided at each switching instead of the current reversal, so that the modulation is effectively represented like it was originally generated.

A phase locked oscillator of conventional type receives the pulse-timed output from the read circuit and synchronizes its output pulses in precise phase with the flux-switchings on the magnetic surface. Phase locked oscillators are well known in the art and commercially used, for example, in digital magnetic tape drives such as the IBM 2420, etc. A clock receives the output of the phase lock oscillator in FIG. 4 and generates a sequence of clock period pulses on its respective output lines T1 through T13. The clock in FIG. 4 may be identical to, or may be the same, clock circuit shown in FIG. 3B used in the modulation embodiment.

Also in FIG. 4 the output of the read circuit is provided to a demodulator circuit comprising pulse segregator circuits, decoder circuits, and a parallelizer. In the pulse segregator, the read circuit output is received by each of 13 AND circuits that also respectively received the clock period lines T1 through T13 to segregate the flux switching pulses on 13 separate lines P1 – P13 in accordance with the time position of the read circuit pulses on a scale of 13 determined by the respective clock period signals on lines T1 – T13. The segregated signals on lines P1 through P13 are provided as inputs to the decoder circuits, which are shown in detail in FIG. 4A. The eight outputs from the decoder circuits are provided to a parallelizer which is a register that collects the decoded information bits B0 – B7 as they occurred when originally provided to the modulator input register in FIG. 3A. The demodulated byte output from the parallelizer is available at its output between clock period signal T13 and the next clock period signal T1, during which the output byte is accepted by the system.

Figure 4A:
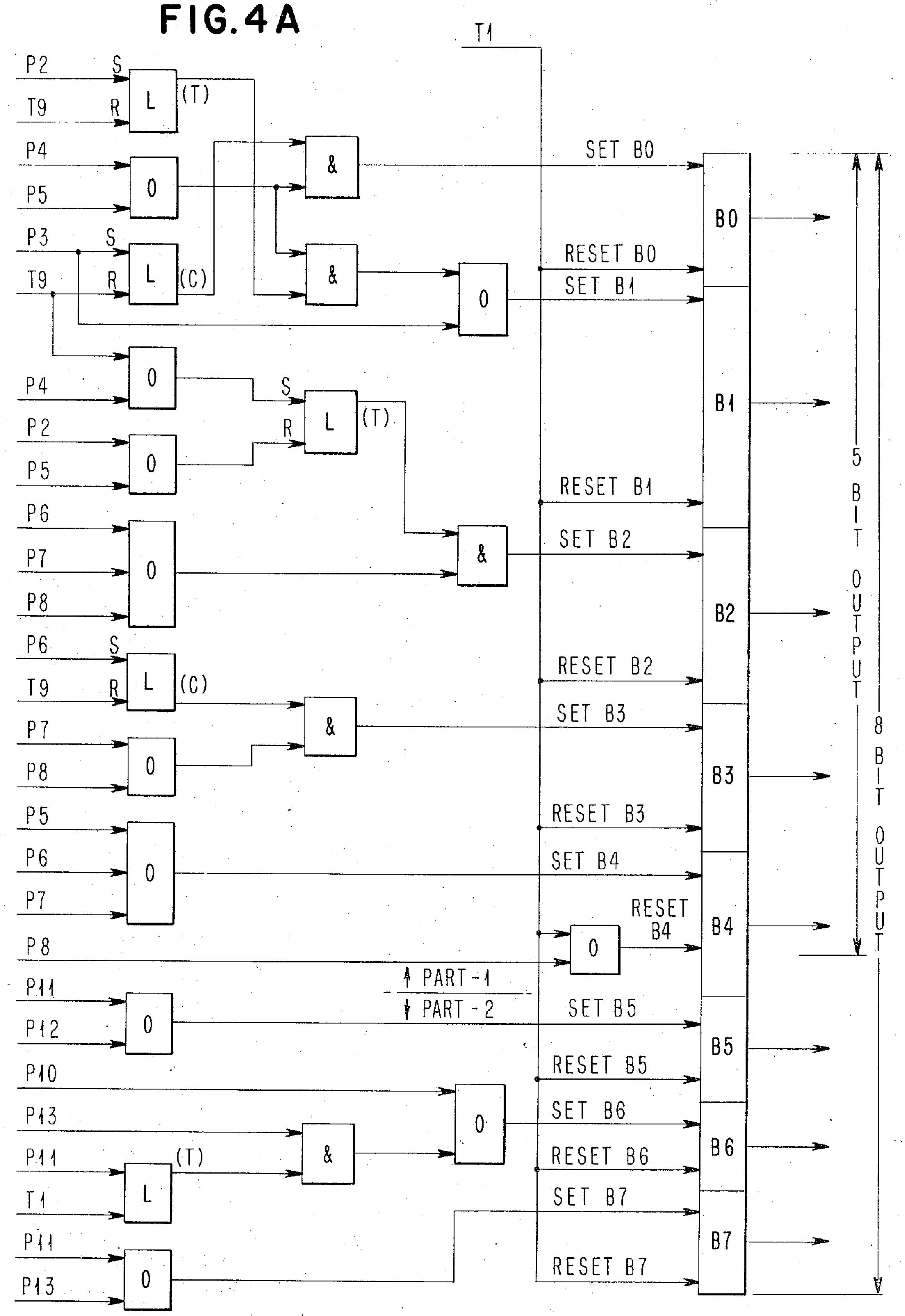

FIG. 4A illustrates the decoder circuits in detail and shows precisely its connections to segregator leads P1 through P13. The pulses from clock period leads T1 and T9 control reset functions in the decoder circuits. (Note that the clock always provides a pulse at clock periods T1 and T9, even though no pulse switching is provided at these times in the modulated signal from the read circuit). The detailed encoder circuit drawing shown in detail in FIG. 4A is self explanatory, and it comprises AND circuits A, OR circuits 0 and latch L circuits, each of which is a well known type of circuit.

In FIG. 4A, the parallelizer comprises register positions B0 through B7 in the conventional circuit form. Each register position has set and reset inputs and is reset at clock period T1, except that position B4 is also reset by a pulse on lead P8 so that it can obtain the correct output.

the described embodiment uses the correspondence between the information bits and the switching patterns shown in FIG. 5A. However, it should be clear to one skilled in the art that the order of the information bit patterns in FIG. 5A may change to have any one-to-one relationship to the illustrated order of switching patterns. The encoding and decoding circuits can be readily changed to correspond to any such coding relationship selected.

Groups of five serial information bits can also be encoded using the circuit shown in FIG. 3C by reversing the illustrated setting of a switch 301. This requires that the clock in FIG. 3B have only its section 1 outputs active, i.e. T9 – T13 are bypassed to recycle every eight clock periods. The decoder in FIG. 4A will automatically handle the received five bit encoded switching sections, i.e. in eight clock periods. In this case the clock in FIG. 4 is correspondingly permitted to cycle only with eight output pulses T1 – T8. In FIG. 4A, T1 replaces T9, and the decoded five information bit output is provided in output register positions B0 – B4. (Note: any five information bits may be taken sequentially from a transmitted sequence of 8 bit bytes. That is, the boundaries for the five information bit groups need not align with the byte boundaries. Then 8 to 5 and 5 to 8 bit byte converters are used respectively before encoding and after decoding to interface the embodiment described herein for encoding and decoding the five bit groups in eight clock period cycles.) The right side of FIG. 5A illustrates five bit codes and corresponding eight bit period switching patterns, i.e. from T1 through T8.

While the invention has been particularly shown and described with reference to perferred embodiments thereof, it will be understood by those skilled in the art that the foregoing and other changes in form and details may be made therein without departing from the spirit and scope of the invention.

What is claimed is:

1. Electrical apparatus for modulating an electrical wave with each received byte containing first and second groups of electrical bit signals, the modulated electrical wave having minimum and maximum multiple clock periods of run-length-limited coding, comprising a clock circuit for generating a set of electrical timing pulses for each received byte to sequentially signal a plurality of clock periods in first and second sequential clock pulse sections, an encoder circuit having first and second parts respectively receiving the first and second groups of electrical bit signals and the timing pulses of the first and second sequential clock pulse sections, the first part in said encoder circuit having means for switching a first electrical waveform between two electrical levels with the first group of electrical bit signals and the timing pulses of the first sequential clock pulse section to generate a different electrical waveform for each different combination of electrical bit signals in said first group, the electrical switchings in the first waveform being spaced by at least two clock periods during said first sequential clock pulse section, and said first waveform excluding a bounding clock period of the first section, the second part in said encoder circuit having means for switching a second electrical waveform between two electrical levels with the second group of electrical bit signals and the timing pulses of the second sequential clock pulse section to generate a different electrical waveform for each combination of electrical bit signals in the second group, the electrical switchings in the second waveform being spaced by at least two clock periods during said second sequential clock pulse section, and said second waveform excluding a bounding clock period of the second section, third and fourth means in said first and second parts, respectively, for further switching the electrical level during each bounding clock period in the first and second electrical waveforms if no switching occurs in any clock period adjacent to each bounding clock period, and serializer means connected to an output of said first and second parts to sequentially connect the first and second electrical waveforms as the modulated output signal for each received byte.

2. Electrical modulating apparatus as defined in claim 1, in which said clock circuit generates a cycle of thirteen electrical timing pulses designating thirteen clock periods, the first clock section including eight clock periods, and the second clock section including five clock periods, said third means switching the bounding clock period in said first section, and said fourth means switching the bounding clock period in said second section, whereby a run-length-limited sequence having a minimum of two clock periods and a maximum of eight clock periods between electrical switchings is obtained in a sequence of electrically modulated output signals.

3. Electrical apparatus for modulating an electrical output with electrical bit signals for each received information group, comprising a clock circuit for generating a set of electrical timing pulses for each received information group to sequentially provide a plurality of clock periods in a sequential clock pulse section, an encoder circuit receiving the electrical bit signals of said information group and the timing pulses from the sequential clock pulse section, a part of said encoder circuit including means for switching an electrical waveform between two electrical levels with the electrical bit signals and the timing pulses from the sequential clock pulse section to generate a different waveform for each different combination of electrical bit signals in said received information groups, in which each waveform has switchings spaced by at least two clock periods, another part of said encoder circuit including means for bounding the electrical waveform on one side with a bounding clock period not used to encode any bits of the received information group, said encoder circuit further switching the electrical waveform during each bounding clock period if no waveform switching occurs in adjacent clock periods, and means for sequentially outputting the electrical waveforms as the modulated signal for each received information group, whereby minimum and maximum multiple clock periods of two and eight clock periods between electrical switchings are provided respectively in the output of said encoder circuit in a sequence of waveforms representing a sequence of information groups.

4. An electrical byte modulating method which handles the bits of each received byte provided as first and second groups of electrical bit signals, comprising the steps of generating in a clock circuit a set of electrical timing pulses for each received byte to sequentially provide a plurality of clock periods from first and second sequential clock pulse sections, electrically transferring respectively to first and second parts of an encoder circuit the first and second groups of electrical bit signals and the electrical timing pulses from the first and second sequential clock pulse sections, switching a first electrical waveform between two electrical levels in the first part of said encoder with the first group of electrical bit signals and the timing pulses from the first sequential clock pulse section to generate a different waveform for each different combination of electrical bit signals in said first group, in which each waveform has switchings spaced by at least two clock periods, also switching a second electrical waveform between two electrical levels in the second part of said encoder with the second group of electrical bit signals and the timing pulses from the second sequential clock pulse section to generate a different waveform for each combination of electrical bit signals in the second group, in which each waveform has switchings spaced by at least two clock periods, bounding the first and second electrical waveforms on one side with a bounding clock period not used to encode any bits of the received byte, further switching the first and second electrical waveforms during each bounding clock period when no waveform switching occurs in adjacent clock periods, and sequentially outputting said first and second electrical waveforms as the modulated signal for each received byte, whereby minimum and maximum multiple clock periods of run-length-limited coding are provided in a fixed-length modulated wave for each byte.

5. An electrical byte modulating method as defined in claim 4, in which the first group includes five bits and the second group includes three bits of each received byte, and in which said generating step sequentially generates a byte cycle of 13 clock periods with the first section having eight clock periods and the second section having five clock periods, and said bounding step applies to the first clock period in each clock section, whereby in a sequence of waveforms encoded for a sequence of received bytes, intervening plural clock periods of no waveform switching occur having a minimum of two clock periods and a maximum of eight clock periods between switchings to support self-clocking detection of the waveform.

6. An electrical byte modulating method which handles the bits of each received information group, comprising the steps of generating in a clock circuit a set of electrical timing pulses for each received information group to sequentially provide a plurality of clock periods in a sequential clock pulse section, electrically transferring respectively to an encoder circuit electrical bit signals of said information group and the sequential clock pulse section, switching an electrical waveform between two electrical levels in said encoder with the electrical bit signals and the timing pulses in the sequential clock pulse section to generate a different waveform for each different combination of electrical bit signals in said information groups, in which each waveform has switchings spaced by at least two clock periods, bounding the electrical waveform on one side with a bounding clock period not used to encode any bits of the received information group, further switching the electrical waveform during each bounding clock period if no waveform switching occurs in adjacent clock periods, and sequentially outputting the electrical waveform as the modulated signal for each received information group, whereby minimum and maximum multiple clock periods of two and eight clock periods between electrical switchings are provided respectively in a sequence of waveforms encoding a sequence of information bit groups.

* * * * *